United States Patent [19]
Lyen

[11] Patent Number: 6,063,176
[45] Date of Patent: May 16, 2000

[54] BRIGHT METALLIC INTAGLIO INK COMPOSITION

[76] Inventor: Eric A. Lyen, 67 Amberwood Crescent, Nepean, Ontario, Canada, K2E 7C2

[21] Appl. No.: 09/383,631

[22] Filed: Aug. 26, 1999

Related U.S. Application Data

[63] Continuation of application No. 09/113,895, Jul. 13, 1998, abandoned.

[51] Int. Cl.$^7$ .................................................. C09D 11/02
[52] U.S. Cl. .................................. 106/31.61; 106/31.63; 106/31.64; 106/31.65; 106/31.9; 106/31.95
[58] Field of Search ............................. 106/31.61, 31.63, 106/31.64, 31.65, 31.9, 31.95, 31.68

[56] References Cited

U.S. PATENT DOCUMENTS

| | | | |
|---|---|---|---|
| 4,490,177 | 12/1984 | Shioi et al. | 106/31.6 |
| 5,445,671 | 8/1995 | Herget et al. | 106/31.9 |
| 5,474,603 | 12/1995 | Miyashita et al. | 106/31.65 |
| 5,849,072 | 12/1998 | Sommer et al. | 106/404 |

FOREIGN PATENT DOCUMENTS 0 253 543 B1   7/1991   European Pat. Off. .

*Primary Examiner*—Helene Klemanski
*Attorney, Agent, or Firm*—Lynn S. Cassan

[57] ABSTRACT

A two-part metallic ink composition for intaglio printing is provided which produces bright and shiny ink deposits when printed. The two parts of the ink are stored separately from each other and mixed together either immediately or within a predetermined time period prior to use. The first part comprises varnish in the amount of 60–85%, wax in the amount of 6–15% and solvent in the amount of 6–25%, by weight. These three constituents of the first part are heated together until the wax has just completely melted, stirred and cooled to room temperature. The resultant mixture, which appears physically as a gelled varnish (vehicle), advantageously permits the formulation of a bright metallic intaglio ink without the use of an extender. The second part comprises metallic pigment. About 1 part by weight of the first part and about 0.5–2.0 parts by weight of the second part are mixed together to form the composition. Preferably, the metallic pigment is pre-wetted with about 2–4% solvent, so as to form a bread crumb-type consistency, before it is mixed with the first part to prevent dusting (i.e. the escape of pigment into the environment) and to assist in the mixing of the two components. The first part may comprise a drier in the amount of 0.4–2.0% by weight. The particle size of the pigment is preferably less than about 18 microns. To produce the brightest reflective appearance the printed ink composition deposit is heated, immediately following printing, to about 65–75° C. for a period of about one second.

15 Claims, No Drawings

6,063,176

BRIGHT METALLIC INTAGLIO INK COMPOSITION

RELATED APPLICATION

This application is a continuation of application Ser. No. 09/113,895 filed Jul. 13, 1998 now abandoned.

FIELD OF THE INVENTION

The invention is in the field of intaglio printing inks, in particular, metallic (reflective) intaglio inks.

BACKGROUND

In the security printing industry a major concern is presented by the use of colour photocopiers by counterfeiters to produce counterfeit documents from security documents. One means of alleviating such counterfeiting would be to incorporate into a security document areas of bright metallic printing because a colour photocopier is unable to accurately reproduce such printing due to certain known, inherent limitations of colour photocopiers themselves (bright gold surfaces are reproduced as yellow and bright silver surfaces are reproduced as grey). However, to date, all attempts in the industry to produce a metallic intaglio ink, which will successfully print a long-lasting metallic image having a bright and shiny appearance, have failed.

Previously introduced metallic inks for intaglio printing have been unable to achieve a bright and shiny appearance and, instead, appear dull and are ineffective. This is because intaglio printed wide lines have a naturally uneven, irregular surface which, combined with the dulling effect of the intaglio ink extender (which is a normal constituent of intaglio inks), results in a yellow or grey colour rather than a highly reflective, bright metallic colour. The printing press properties (i.e. pertaining to ink flow and transfer and plate wiping) of such previously introduced inks has also proven to be poor.

Accordingly, there has been a long-standing need in the industry for a metallic intaglio ink which can produce through intaglio printing a stable (long-lasting), bright, reflective metallic image.

SUMMARY OF THE INVENTION

In accordance with the invention there is provided a two-part metallic ink composition for intaglio printing, the parts of which are stored separately from each other and mixed together either immediately or within a predetermined time period prior to use. The first part comprises a mixture comprising varnish in the amount of about 60–85% by weight, wax in the amount 6–15% by weight and solvent in the amount of about 6–25% by weight, the wax having been melted into the mixture. The second part comprises metallic pigment. To make the composition about 1 part by weight of the first part and about 0.5–2.0 parts by weight of the second part are mixed together. Preferably, the pigment is pre-wetted with solvent before it is mixed with the first part. Depending upon the pigment, the first part may include a drier in the amount of 0.4–2.0% by weight. The particle size of the pigment is preferably less than about 18 microns.

In accordance with a further aspect of the invention there is provided a freshly mixed metallic ink composition for intaglio printing, the composition not comprising any significant amount of extender constituent and comprising: (i) 20–56% by weight of varnish; (ii) 33–67% by weight of a metallic pigment; (iii) 2–10% by weight of wax; (iv) 2–17% by weight of solvent; and, depending upon the pigment, (v) 0.1–1.3% by weight of drier, the wax having been melted into a mixture comprising the varnish, wax and solvent prior to adding the pigment.

If desired, in the foregoing metallic ink composition a pearlescent pigment may replace the metallic pigment to produce a bright pearlescent intaglio ink composition.

DETAILED DESCRIPTION OF A PREFERRED EMBODIMENT

The applicant has developed an intaglio metallic ink composition which, advantageously, does not contain an extender. This contrasts with the prior art intaglio inks which normally include about 30–60% by weight of an extender such as calcium carbonate, barium sulphate, clay (e.g. bentonite clay), titania or silica. Previously it was generally assumed that the inclusion of an extender is necessary for intaglio inks in order to provide means for adequately controlling the flow and plate wiping properties of the ink. It is common knowledge in the printing art that the final ink properties are strongly related to the ratio of the extender to the varnish constituent and that this ratio is used to effectively adjust properties such as ink flow and wiping behaviour.

Surprisingly, it has been found by the applicant both that the extender in such inks suppresses the brightness of the metallic particles therein, causing the resulting ink deposit to appear dull yellow or grey rather than bright gold or silver, and that the extender may be omitted altogether under certain conditions without destroying the utility of the ink for use in intaglio printing equipment.

Advantageously, the ink composition developed by the applicant does not include any extender constituent. It is, however, a less stable mixture, as compared with the prior art intaglio inks, in that the mixture will solidify if not used within a specific time period, the amount of time depending upon the vehicle used for the composition. For cylinder wipe intaglio inks a vehicle having a high acid number in the range of 45–80 is usually used and with such a vehicle used for the applicant's subject cylinder wipe inks these inks should be used within 48 hour after preparation. For smooth paper wipe and crepe paper wipe intaglio inks a vehicle having a low acid number (less than 15) is usually used and with such a vehicle used for the applicant's paper wipe inks as defined herein they have a useful life in excess of two months.

Apart from the fact of its limited shelf-life, however, the ink composition of the subject invention has highly satisfactory properties for use in intaglio printing and produces the desirable property of a long-lasting, bright metallic ink deposit when printed.

The applicant has overcome the aforesaid difficulty presented by the tendency of the prepared (i.e. mixed) ink composition to solidify through the development of a two-part component system wherein each of the two components has a stable shelf-life for purposes of storage prior to use. The two components are stored separately and mixed together, by simple stirring, only when they are to be used.

One part (component) of the subject two-part ink composition comprises a mixture of the following constituents:

| Constituent | Percent by Weight |
| --- | --- |
| Varnish* | 60.00–85.00 |
| Wax | 6.00–15.00 |
| Solvent | 6.00–25.00 |
| Drier | 0.40–2.00 |
| (may be optional) | |

*also referred to as vehicle (the terms vehicle and varnish being used interchangeably in the industry and herein.)

These constituents of the first part are heated together until the wax has just completely melted, stirred and cooled to room temperature. The resultant mixture, which appears physically as a gelled varnish (vehicle), advantageously permits the formulation of a bright metallic intaglio ink without the use of an extender.

Because of its substantial vehicle content this part is referred to as the vehicle component by the applicant. A preferred vehicle component comprises 75.00% by weight varnish, 12.00% by weight wax, 12.00% by weight solvent and 1.00% by weight drier.

If desired, this vehicle component may be tinted with dyestuff in the 0.50% to 2.00% range to alter the final shade of the metallic ink. Small amounts of fluorescent pigment, optical brightener or unique taggants in the 0.1% to 2.0% by weight range may be added to the vehicle component to increase the security of the printed document. Pearlescent pigments, however, should not be mixed with metallic pigments because pearlescent pigment has a dulling effect on metallic pigment similar to intaglio extenders.

The second part (component) of the subject two-part ink composition comprises metallic pigment(s). Preferably, the metallic pigment is pre-wetted with about 2–4% solvent, so as to form a bread crumb-type consistency, before it is mixed with the first part to prevent dusting (i.e. the escape of pigment into the environment) and to assist in the mixing of the two components.

Metallic bronze ("gold") pigments are available in three shades and these may be mixed in any ratio to obtain the desired shade of gold. Aluminum ("silver") and copper pigments should both be used by themselves (i.e. not mixed with any other pigment). If, instead of a bright metallic intaglio ink, it is desired to produce a bright pearlescent intaglio ink (i.e. such that one of the tones of the duo-tone pearlescent ink may be a bright metallic tone) the second component for the ink mixture may instead be pearlescent pigment. Pearlescent pigments are manufactured by Merck of Germany and sold under the name Afflair Pigments and by Mearl Corporation of the U.S.A. and sold under the name Mearl Pigments.

When the ink composition is required for printing the foregoing two parts are mixed together, by stirring 0.5–2.0 parts by weight of the pigment component (depending on the plate/engraving design and whether a paper or cylinder wipe type of press is used) into 1 part by weight of the vehicle component. The resulting ink composition then has the following formulation:

Varnish - 20–56% by weight

Solvent - 2–17% by weight

Metallic powder - 33–67% by weight

Wax - 2–10% by weight

Drier - 0.1–1.3% by weight

The varnish may be any of the varnishes (vehicles) which are available in the marketplace for successfully formulating intaglio inks (for cylinder wipe, crepe paper wipe or reverse smooth paper wipe equipment, depending upon the application). Such varnishes are well-known in the industry and readily available in the marketplace. Suitable varnishes may contain none or up to 30.00% by weight of solvent. Tack is an important ink property and this is usually controlled by the amount of solvent added to the formulation.

The amount of varnish in the mixed ink formulation will depend upon the application i.e the press and the design. A design having deep engraving would require a stiff ink to print successfully, and this implies the use of less varnish. By contrast, a design having shallow engraving would entail the use of a higher varnish content. As is well-known in the industry the choice of varnish to be used in any given application is limited by the press to be used i.e. paper wipe or cylinder wipe. Although a cylinder wipe vehicle formulation may be successfully used on paper wipe equipment the converse is not true and a paper wipe vehicle formulation is not suitable for use in cylinder wipe equipment. Varnishes which are preferred for use by the applicant are the following:

| Product Name | Supplier |
| --- | --- |
| PML #8450 | PML of Limassol, Cyprus |
| PML #8455 | " |
| PML #8456 | " |
| Solvar | Lawter International of Rexdale, Ontario |
| Uroset | " |
| #4310 Cargill | Eastech, P.A., U.S.A. |

The metallic powder may be any suitable bronze, copper and/or aluminum pigment, or paliocrom pigment, the particle size of which is preferably smaller than about 18 microns. Preferred pigments used by the applicant include those manufactured by Eckart-werke of Germany and sold under the names Rotosafe Bronze 700 series and Rotosafe silver 760 series. Such pigments are also manufactured by Canbro Inc. of Valleyfield, Quebec, Canada and sold under the names Pale, Rich Pale and Rich. For paliocrom pigment the applicant's preferred source is BASF of Ludwigshagen, Germany.

In the resultant mixed ink composition, i.e. a mixture of the foregoing two components, the pigment concentration is 33–67% by weight and preferably 45% by weight. The particle size of the pigment is preferably less than 18 microns with the mean particle size being from 6.5 to 7.5 microns and 10% being in the range of 1.5 to 3.5 microns. This represents a compromise as between the resulting print quality and the brightness level of the print deposit since the larger the particle size, the brighter the deposit but the smaller the particle size, the better the print quality. A leafing grade of pigments is preferred but a non-leafing grade is considered acceptable. The density of gold pigment is 7–8 g/ml and of silver pigment is 2.5–3.0 g/ml. The resulting viscosity of the ink composition is in the range of 10 to 20 poise.

The wax is used to prevent the varnish from penetrating through the paper (or other substrate). All waxes can be used but the preferred waxes used by the applicant are Carnauba or Candelilla supplied by Shamrock of New Jersey, U.S.A. which are physically hard and have low melting points (these properties being preferable).

The drier, if used (this constituent may be optional), may be either a calcium or manganese drier as routinely used with oxidatively cured ink systems. The preferred driers used by the applicant are sold under the names Calcium Octoate 10% and Manganese Octoate 6% by Huls Canada. The inclusion of a drier is optional when metallic gold/bronze or copper pigments are used because these pigments are themselves driers for the ink. However, use of a drier is normally needed when using aluminum, paliocrom or pearlescent pigment.

The high varnish to pigment ratio of the ink composition results in a high ink tack which provides a high degree of ink transfer from the engraving to the substrate. This high ink transfer is responsible for the high color density, tactility and bright metallic appearance of the printed ink.

The subject ink composition is best suited for substrates having low porosity and low oil absorption such as banknote paper (preferably highly sized and relatively dense) or coated polymer materials both of which produce good results.

Best results are produced when the image area coverage for which the ink composition is used is less than about 3×3 cms and not in direct contact with areas having non-metallic intaglio ink deposits (because of a tendency to bleed or intermingle with the adjacent ink and thereby detract from the overall appearance). As well, the ink composition is preferably applied at a minimum ink feed rate to produce a better print quality. Use of a low ink feed combined with a low image area for the ink, relative to total image area, avoids any tendency of the ink to accumulate on the first blade which removes ink from the wiping cylinder of a cylinder wipe system. Because of the tendency of the ink to solidify quickly the ink residues from the wiping cylinder tank should be aggressively removed.

To produce the brightest reflective appearance the printed ink composition deposit is heated, immediately following printing, to about 65–75° C. for a period of about one second. Hot air or infrared lights may be used to raise the temperature of the print deposit to within this temperature range.

What is claimed is:

1. A two-part metallic ink composition for intaglio printing, the parts of which are stored separately from each other and mixed together either immediately or within a predetermined time period prior to use, said composition comprising:
   (a) in the first part, a mixture of varnish in the amount of about 60–85% by weight, wax in the amount of about 6–15% by weight, solvent in the amount of about 6–25% by weight and drier in the amount of 0.4–2.0% by weight, said wax having been melted, by heating, into said mixture; and,
   (b) in the second part, metallic pigment; whereby about 1 part by weight of said first part and about 0.5–2.0 parts by weight of said second part are mixed together to form said composition.

2. A two-part metallic ink composition for intaglio printing, the parts of which are stored separately from each other and mixed together either immediately or within a predetermined time period prior to use, said composition comprising:
   (a) in the first part, a mixture of varnish in the amount of about 60–85% by weight, wax in the amount of about 6–15% by weight and solvent in the amount of about 6–25% by weight, said wax having been melted, by heating, into said mixture; and,
   (b) in the second part, gold/bronze or copper metallic pigment;
whereby about 1 part by weight of said first part and about 0.5–2.0 parts by weight of said second part are mixed together to form said composition.

3. A metallic ink composition according to claim 2 wherein said first part comprises a drier in the amount of 0.4–2.0% by weight.

4. A two-part metallic ink composition according to claim 2 wherein the particle size of said pigment is less than about 18 microns.

5. A two-part metallic ink composition according to claim 1 wherein the particle size of said pigment is less than about 18 microns.

6. A freshly mixed metallic ink composition for intaglio printing, said composition not comprising any significant amount of extender constituent and comprising:
   (a) 20–56% by weight of varnish;
   (b) 33–67% by weight of a metallic gold/bronze or copper pigment;
   (c) 2–10% by weight of wax; and,
   (d) 2–17% by weight of solvent.

7. A metallic ink composition according to claim 6 comprising a drier in the amount of 0.1–1.3% by weight.

8. A freshly mixed metallic ink composition for intaglio printing, said composition not comprising any significant amount of extender constituent and comprising:
   (a) 20–56% by weight of varnish;
   (b) 33–67% by weight of metallic pigment;
   (c) 2–10% by weight of wax;
   (d) 2–17% by weight of solvent; and,
   (e) 0.1–1.3% by weight of drier.

9. A metallic ink composition according to claim 6 wherein said wax has been melted, by heating, into a mixture comprising said varnish, wax and solvent prior to adding said pigment thereto.

10. A metallic ink composition according to claim 8 wherein said wax has been melted, by heating, into a mixture comprising said varnish, wax, solvent and drier prior to adding said pigment thereto.

11. A metallic ink composition according to claims 9 or 10 wherein said pigment has been pre-wetted with solvent prior to adding the same to said mixture.

12. A metallic ink composition according to claims 6,8,9 or 10 wherein the particle size of said pigment is less than about 18 microns.

13. A two-part pearlescent ink composition for intaglio printing, the parts of which are stored separately from each other and mixed together either immediately or within a predetermined time period prior to use, said composition comprising:
   (a) in the first part, a mixture comprising varnish in the amount of about 60–85% by weight, wax in the amount of about 6–15% by weight, solvent in the amount of about 6–25% by weight and drier in the amount of about 0.1–1.3% by weight, said wax having been melted into said mixture by heating, and
   (b) in the second part, pearlescent pigment; whereby about 1 part by weight of said first part and about 0.5–2.0 parts by weight of said second part are mixed together to form said composition.

14. A pearlescent ink composition according to claim 13 wherein the particle size of said pigment is less than about 18 microns.

15. A two-part metallic ink composition according to claims 4 or 5 comprising an additive selected from the group consisting of unique taggants, fluorescent pigments and dyes.

* * * * *